United States Patent [19]

Parker et al.

[11] Patent Number: 4,487,363

[45] Date of Patent: Dec. 11, 1984

[54] BYPASS CONTROL SYSTEM TO MAINTAIN A CONSTANT AIR SUPPLY PRESSURE IN A HVAC DUCT SYSTEM

[75] Inventors: Jeffrey L. Parker; Edward Parker, both of Jacksonville, Fla.

[73] Assignee: Parker Electronics, Inc., Jacksonville, Fla.

[21] Appl. No.: 470,331

[22] Filed: Feb. 28, 1983

Related U.S. Application Data

[63] Continuation-in-part of Ser. No. 434,259, Oct. 14, 1983, and Ser. No. 454,483, Dec. 29, 1982.

[51] Int. Cl.³ .................................................. F24F 7/00
[52] U.S. Cl. ........................................ 236/49; 165/22; 417/280
[58] Field of Search ................ 236/49; 98/1, 5, 33 R; 165/22, 15; 417/280

[56] References Cited

U.S. PATENT DOCUMENTS

| | | | |
|---|---|---|---|
| 4,086,781 | 5/1978 | Brody et al. | 236/49 |
| 4,327,559 | 5/1982 | Spethmann | 236/49 X |
| 4,428,529 | 1/1984 | Bentsen | 236/49 |

Primary Examiner—William E. Wayner
Attorney, Agent, or Firm—Arthur G. Yeager

[57] ABSTRACT

A bypass control system and method monitors and controls the amount of air recirculated through a bypass duct from the air supply outlet supplied by a fan and motor from a single zone HVAC unit to the air intake thereof, a stepper motor driven bypass damper is located in the bypass duct having a damper blade movable between opened and closed positions and intermediate positions therebetween, and a bypass monitor is connected to the bypass damper for controlling the operation of the stepper motor of the bypass damper. A first amperage sensor is looped around the common lead of the motor and the monitor provides information indicative of the amount of work performed by the motor to the monitor, the motor performing less work when static air build up occurs at the outlet due to closure of dampers in the duct system conditioning air to a plurality of zones, and the monitor causes the bypass damper to open to correspondingly compensate for the static air pressure build up by reducing same and causing more air to be recirculated through the bypass duct to maintain the air pressure supplied by the HVAC unit to the duct system generally constant.

20 Claims, 5 Drawing Figures

BYPASS CONTROL SYSTEM TO MAINTAIN A CONSTANT AIR SUPPLY PRESSURE IN A HVAC DUCT SYSTEM

CROSS REFERENCE TO RELATED APPLICATIONS

This application is a continuation-in-part of our prior applications Ser. No. 434,259, filed Oct. 14, 1983 and Ser. No. 454,483 filed Dec. 29, 1982, which are incorporated herein by reference.

FIELD OF THE INVENTION

The present invention generally relates to the monitoring and control of a single zone HVAC unit, in which a plurality of zone control damper systems are used in the duct system to control the conditions in a plurality of zones, whereby when the zone control dampers are modulating to close positions, the air supply pressure in the outlet duct from the HVAC unit compensates for the increases of air pressure due to the closure of the dampers and bypasses some of the air from the outlet duct back through the HVAC unit without such bypassed air flowing through the inlet ducts to the zone control damper systems, i.e., maintains the air supply pressure from the HVAC unit to the control damper systems generally constant.

DESCRIPTION OF THE PRIOR ART

In our copending applications Ser. No. 434,259 and Ser. No. 454,483, there are disclosed (A) a motorized damper and thermostat arrangement associated with a single zone for controlling the conditioning of air in that zone and (B) a plurality of A above associated with a single HVAC unit and a control system which permits such HVAC unit to become a multiple zone HVAC system. Particularly in B above when a plurality of individual dampers and their associated thermostats are used to control the temperature in each of a plurality of zones being supplied conditioned air from a single HVAC unit, static air pressure builds up or increases in the ducts as the individual dampers modulate closed, thereby increasing the pressure of the air supplied through the ducts to various dampers which remain open.

Prior attempts have been made to resolve the aforementioned problem of static air build-up, as by inserting a bypass damper between the air supply outlet of the HVAC unit and the return air intake of such a unit to cause a recirculation of a quantity of air or an approximation thereof which may have been closed off by zone dampers or the like and to approximate a more uniform air supply pressure to the various zones. In most of the prior art systems, the bypass damper has been controlled by an air pressure sensor, a velocity sensor or a barometric type sensor associated with the air supply outlet of the HVAC unit. Such prior art systems have many shortcomings among which are that the prior art dampers did not function well and sometimes may be closed when they should have been open and the difficulty if not impossibility of locating the prior art sensors within the air supply outlet of the HVAC unit or other location in the main duct system to achieve the predetermined and consistent results desired.

The bypass control system in accord with this invention alleviates the aforementioned problems in the prior art systems, by providing an improved bypass damper assembly, disclosed in our prior application Ser. No. 434,259, in the bypass duct between the air supply outlet and return air intake of the HVAC unit, and by providing an improved sensing and monitoring system for controlling such improved bypass damper assembly and for maintaining the air pressure from the air supply outlet of the HVAC unit to the main duct constant during modulation between opening and closing of one or more of a plurality of zone dampers associated with branch ducts from the main duct.

SUMMARY OF THE INVENTION

In accordance with the present invention a bypass system is provided to a single zone HVAC unit to maintain a constant air supply pressure in a HVAC unit duct system supplying conditioned air to a plurality of zones through motorized dampers which modulate open and closed according to zone thermostats respectively associated with such dampers, and such zone thermostats also controlling, through a monitor system, the operation of the HVAC unit. Basically, this is accomplished herein by controlling the modulation of the bypass damper, in its simplest terms, in response to or in accord with the current being drawn by the fan motor of the HVAC unit. With closure of one or more of the zone dampers, static air pressure in the duct system increases and consequently less air is moved by the fan blades. Thus the fan motor performs less work and draws less current and such current fluctuations are sensed by a current sensor connected to the fan motor and is fed to a bypass controller and monitor which modulates the bypass damper open or closed or therebetween to regulate the air being bypassed or recirculated between the air supply outlet and the return air intake of the HVAC unit. This is accomplished within a short period of time and when the amperage drawn by the fan motor returns to its original setting stored in the controller and monitor, the air pressure in the main duct closely approximates a constant air pressure supply regardless of the number of dampers opened or closed.

The bypass monitor herein disclosed includes a microprocessor system which receives and assesses information obtained from a fan motor and compares same with information stored in the memory of the controller that such fan motor information can be employed by the monitor to properly control and modulate the bypass damper between open and closed positions or therebetween depending on the fan motor information received by the bypass monitor.

BRIEF DESCRIPTION OF THE DRAWINGS

The novel features believed to be characteristic of this invention are set forth with particularity in the appended claims. The invention, itself, however, both as to its organization and method of operation, together with further objects and advantages thereof, may best be understood by reference to the following description taken in connection with the accompanying drawings in which:

DESCRIPTION OF THE PREFERRED EMBODIMENT

Figure 1:
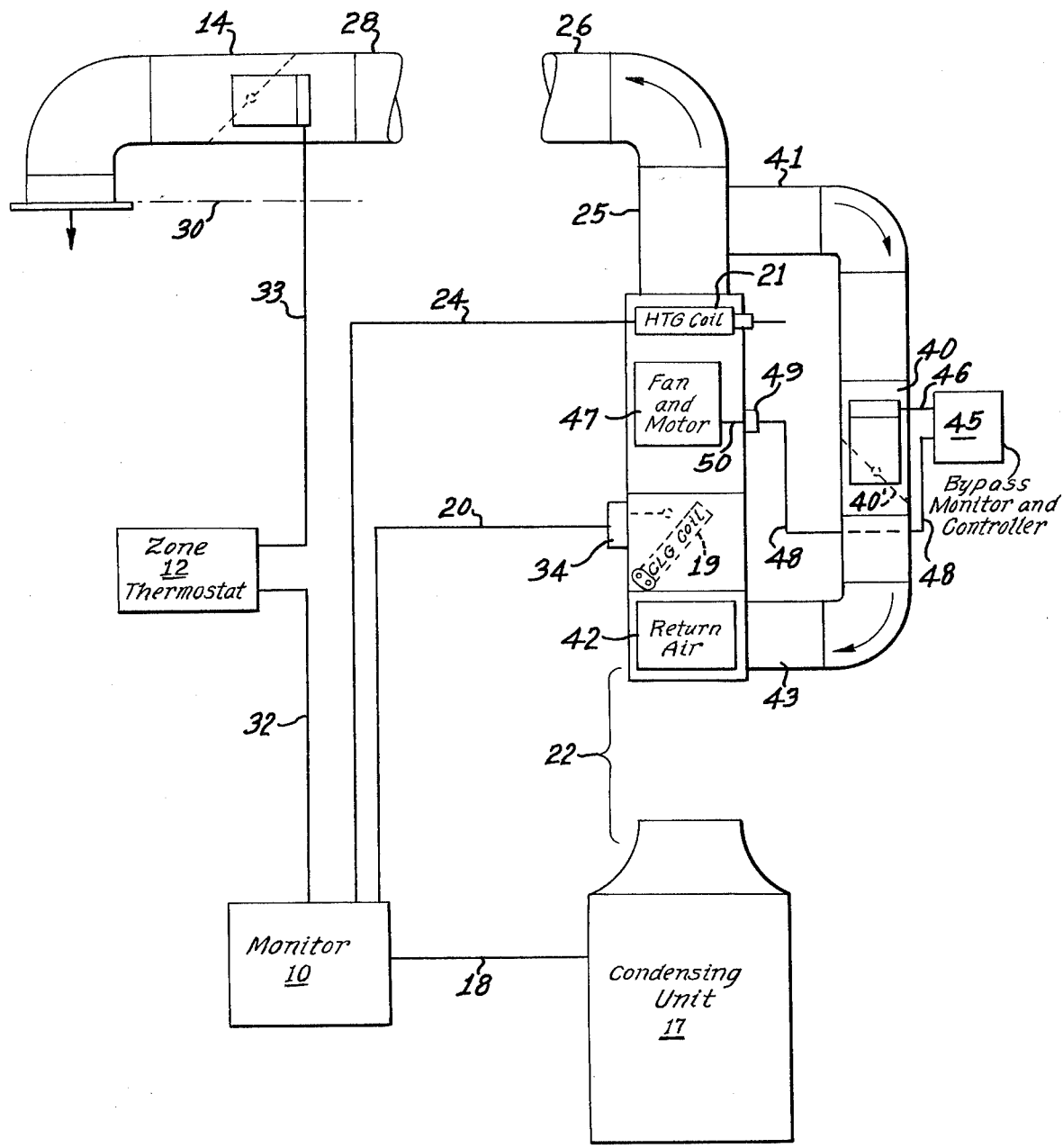
FIG. 1 is a schematic illustration of a typical installation showing the mechanical components and the electrical components of the bypass control system, according to this invention, in association with the HVAC unit, the monitor for controlling same and one zone thermostat and damper of a plurality of zone thermostats and dampers.

Referring now more particularly to FIG. 1, the monitor is designated by reference numeral 10 and has an electrical connection 32 to thermostat 12 which in turn has an electrical connection 33 to damper assembly or governor 14. The details of the monitor 10 have been fully disclosed in our prior copending application Ser. No. 454,483, and the details of the thermostat 12 and the damper 14 have been fully disclosed in our prior copending application Ser. No. 434,259. It is to be understood that thermostat 12 and damper 14 are representative and usually a plurality of thermostats 12 and dampers 14 are provided in or associated with each room or zone 30. The damper 14 is located in a branch air duct 28 which communicates between zone 30 and the main air supply duct 26 connected to the outlet 25 of the HVAC unit 22. The monitor 10 includes an electrical connection 24 to the heating coil 21 of the HVAC unit 22. A monitor sensor probe 34 associated with the cooling coil 19 of the HVAC unit 22 is coupled to monitor 10 via electrical connection 20. As explained in the aforementioned application Ser. No. 454,483, the monitor sensor probe 34 is shown in position to sense the refrigeration circuit only without sensing the resistance heater 21 in a heat pump installation. In other installations the monitor sensor probe 34 is located where it will sense the temperature of both the heating and cooling circuits. Also, monitor 10 is provided with an electrical connection 18 to condensing unit 17 of the HVAC unit 22.

The bypass system 36 in accord with this invention includes a bypass damper 40 communicating with the air outlet 25 from the HVAC unit 22 by branch duct 41 and communicating with the air return 42 of the HVAC unit 22 by branch duct 43. Bypass damper 40 may be substantially identical to governor or damper 14 fully disclosed in the aforementioned application Ser. No. 434,259. The size of the bypass damper 40 together with the size of branch ducts 41 and 43 depend on many variables known to a person skilled in the art, but typically the sizes include 8, 10, 12 and 16 inches.

Figure 2:
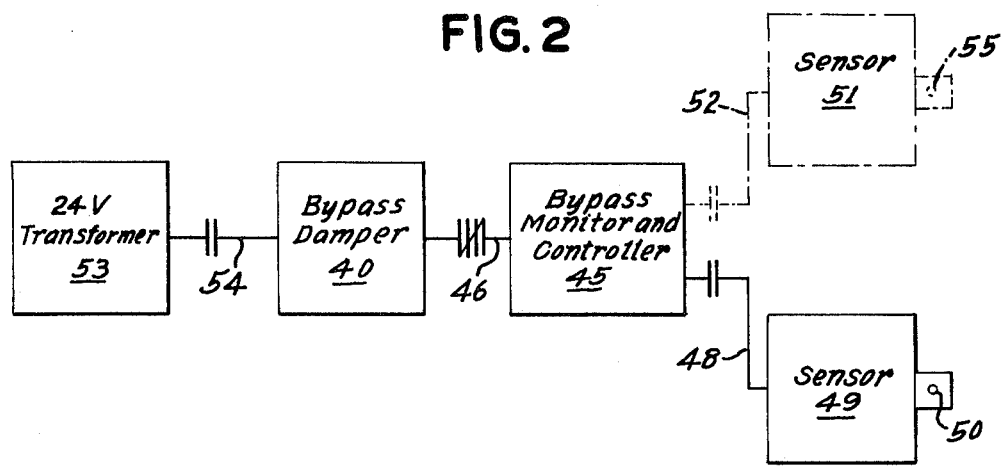
FIG. 2 is a block diagram of the bypass control system employed in a one speed fan motor installation and showing in broken lines the additional sensor required for two speed motor installations.

A bypass monitor and controller 45 is coupled to the bypass damper 40 by elecrtrical connection 46 and is coupled to the fan motor 47 by electrical connection 48 and sensor 49, sensor 49 preferably being an amperage sensor looped around the common electrical connection 50 of the fan motor 47. If the fan motor 47 is a two speed motor, another current sensor 51 is required looped about the high speed electrical lead 55 of such two speed motor (not shown) and current sensor 51 has an electrical connection 52 back to bypass monitor and controller 45. The above circuit arrangement is illustrated in the block diagram FIG. 2, which also shows the 24 VAC transformer 53 coupled by electrical connection 54 to bypass damper 40.

Figure 3:
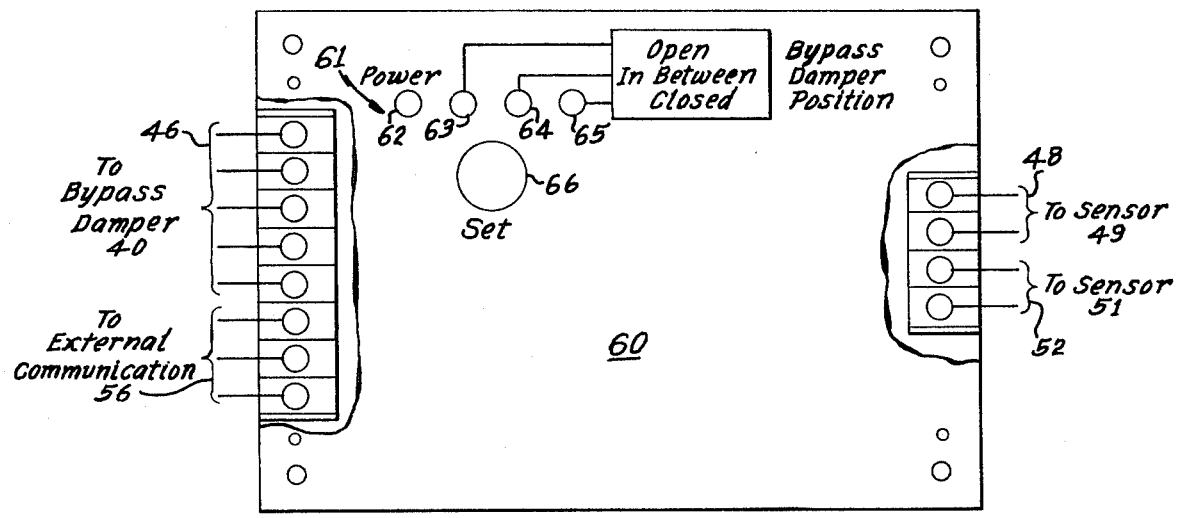
FIG. 3 is a plan view of the control panel of the bypass monitor and controller of this invention.

FIG. 3 discloses a control panel 60 of a cabinet or the like which is shown as part of the monitor and controller 45 including designated connection 46 to bypass damper 40, connection 48 to sensor 49 and the alternate broken line connection 52 to sensor 51. The controller 45 is electrically connected for external communication, as to a remote computer or the like, through lines 56. The light array 61 includes a power light 62 indicating that power is being received by the bypass monitor and controller 45 and three bypass damper position lights 63, 64 and 65 respectively indicating open, partially opened (or closed) and closed positions of the bypass damper 40. The panel 60 is also provided with set (and reset) button switch 66 which will be explained hereinafter with respect to setting the memory U2 of monitor and controller 45.

When lights 63 or 65 flashes, this indicates that the damper blade is being moved, i.e., if light 63 is flashing this indicates that the damper 40 is opening; and if light 65 is flashing, this indicates that the damper 40 is closing. When lights 63, 64 or 65 is on constantly, this indicates no movement of the damper blade 40' and only one of these lights should be on constantly at any one time. However, if all four lights 61, 63, 64 and 65 are on constantly, this indicates that the current set-point has not been entered into the memory U2, hereinafter described, or memory failure and would require setting of the memory U2, as set forth hereinafter. If all lights 63, 64 and 65 flash simultaneously, this is indicative of one or more of the following: (a) reduced air flow caused by dirty filters, belt slippage, etc. (b) attempting to enter set-point into memory U2 with fan motor 47 not operating or (c) defective bypass damper 40.

As set forth previously, the bypass control system 36 utilizes a computerized monitor and controller 45 to change the position of a bypass damper 40 in a bypass duct between the air outlet and return air intake of a HVAC unit 22. Such a bypass control system is effective to inhibit the HVAC duct system from excessive static air pressures. When the dampers 14 are used to control multiple zones 30 of a single zone HVAC unit; excessive static air pressure in the duct system will occur as the zone dampers modulate closed. To compensate for excessive static air pressure from occurring, the bypass control system 36, herein disclosed will alleviate such problem.

The bypass control system 36 is to be used on HVAC unit 22 which is equipped with forward curved fans. As the zone control dampers 14 modulate closed, the amount of air which the HVAC fan is moving will drop due to the increased static air resistance in the duct system. As the fan does less work, the amount of current drawn by the fan motor 47 will be less and the monitor and controller 45 senses the drop in amperage and modulates the bypass damper 40 open until the fan amperage returns to its original setting. Thus, a predetermined amount of supply air from the HVAC unit 22, is bypassed through bypass damper 40 to the HVAC return air intake without passing into the main air supply duct 26.

As the zone control dampers 14 modulate closed, an increase in the main air supply duct 26 air pressure will result. Consequently, the bypass damper should be selected to bypass the quantity of air which is being closed off by the dampers 14 and to maintain a reasonable supply duct air pressure when most of the zone dampers are closed.

While most low pressure duct systems are designed about 0.1" WC static air pressure, a good bypass system design dictates that the bypass damper 40 will be selected to increase the static air pressure to 0.4" WC–0.6" WC. Accordingly, one needs to 1. Determine the maximum CFM to be bypassed through the bypass damper 40.

2. Determine the maximum allowable static air pressure in the main supply duct 26.

3. Locate the "Max. System Static Pressure" column in Table I.

4. Under the column in Step #3, locate the "CFM" closest to that determined in Step #1.

5. Find the recommended damper size by reading horizontally to the left under "Bypass Size".

For example:

A 10 ton 4000 CFM HVAC unit 22, including monitor 10 and eight 500 CFM dampers 14 for eight zones, similar to zone 30. One zone 30 may call for conditioning of the air while the other seven zones are satisfied causing seven dampers 14 to close. Thus, taking the above Steps in order:

TABLE I 1. 4000 CFM − 500 CFM = 3500 CFM to be bypassed.
2. Select .5" WC.
3. See below.
4. See below. } Steps indicated within a circle.
5. See below.

| Bypass size | MAX. SYSTEM STATIC PRESSURE "W.C. | | | | | | |
|---|---|---|---|---|---|---|---|
| | .3 | .4 | .5 | .6 | .7 | .8 | .9 |
| 8" | 410 | 480 | 540 | 600 | 660 | 720 | 770 |
| 10" | 750 | 900 | 1000 | 1100 | 1200 | 1300 | 1400 |
| 12" | 1240 | 1430 | 1610 | 1795 | 1980 | 2100 | 2250 |
| 16" | 2700 | 3100 | 3450 | 3800 | 4100 | 4400 | 4700 |

Figure 4A:
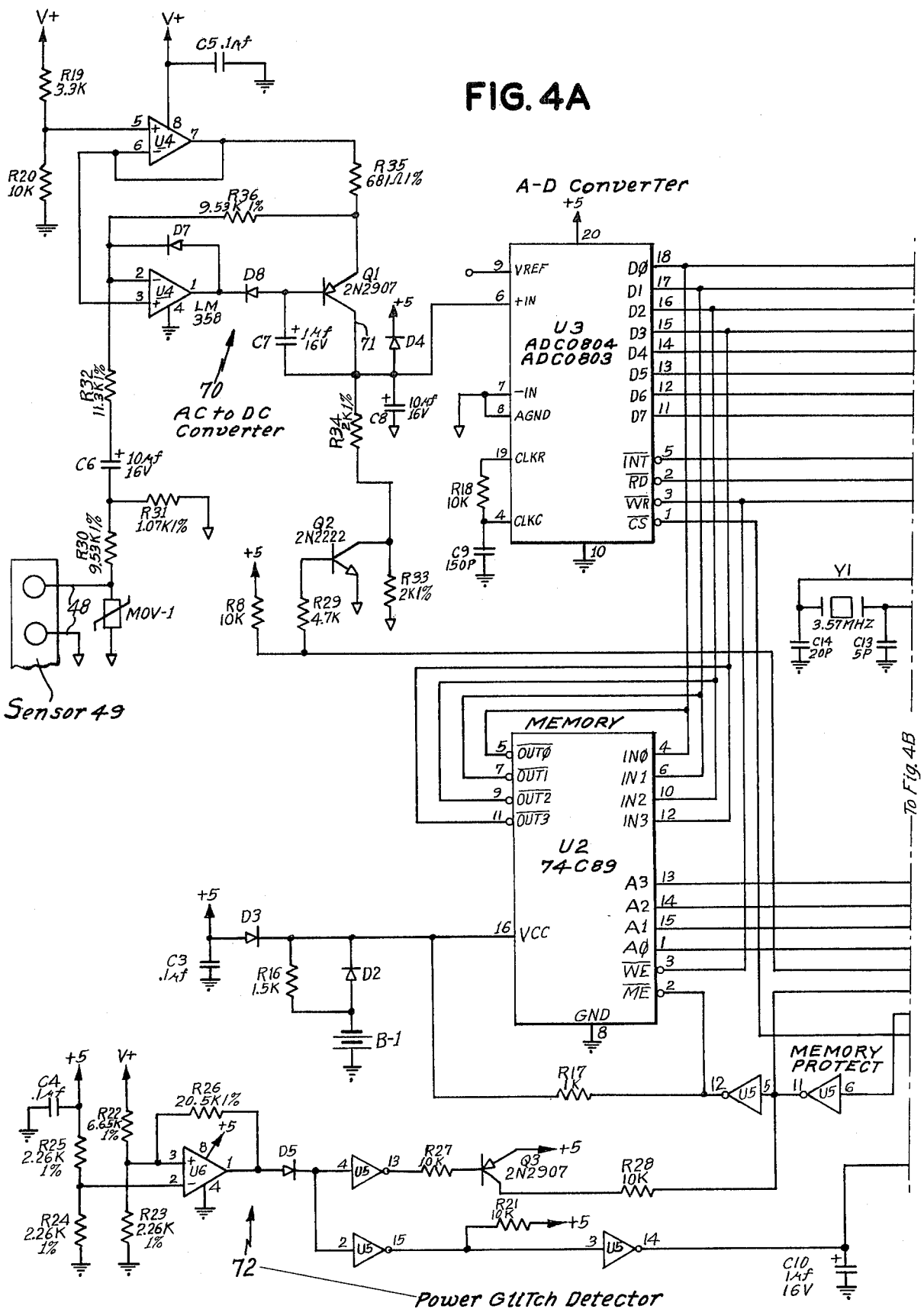
FIGS. 4A and 4B is a circuit diagram of the bypass monitor and controller circuit.
Figure 4B:
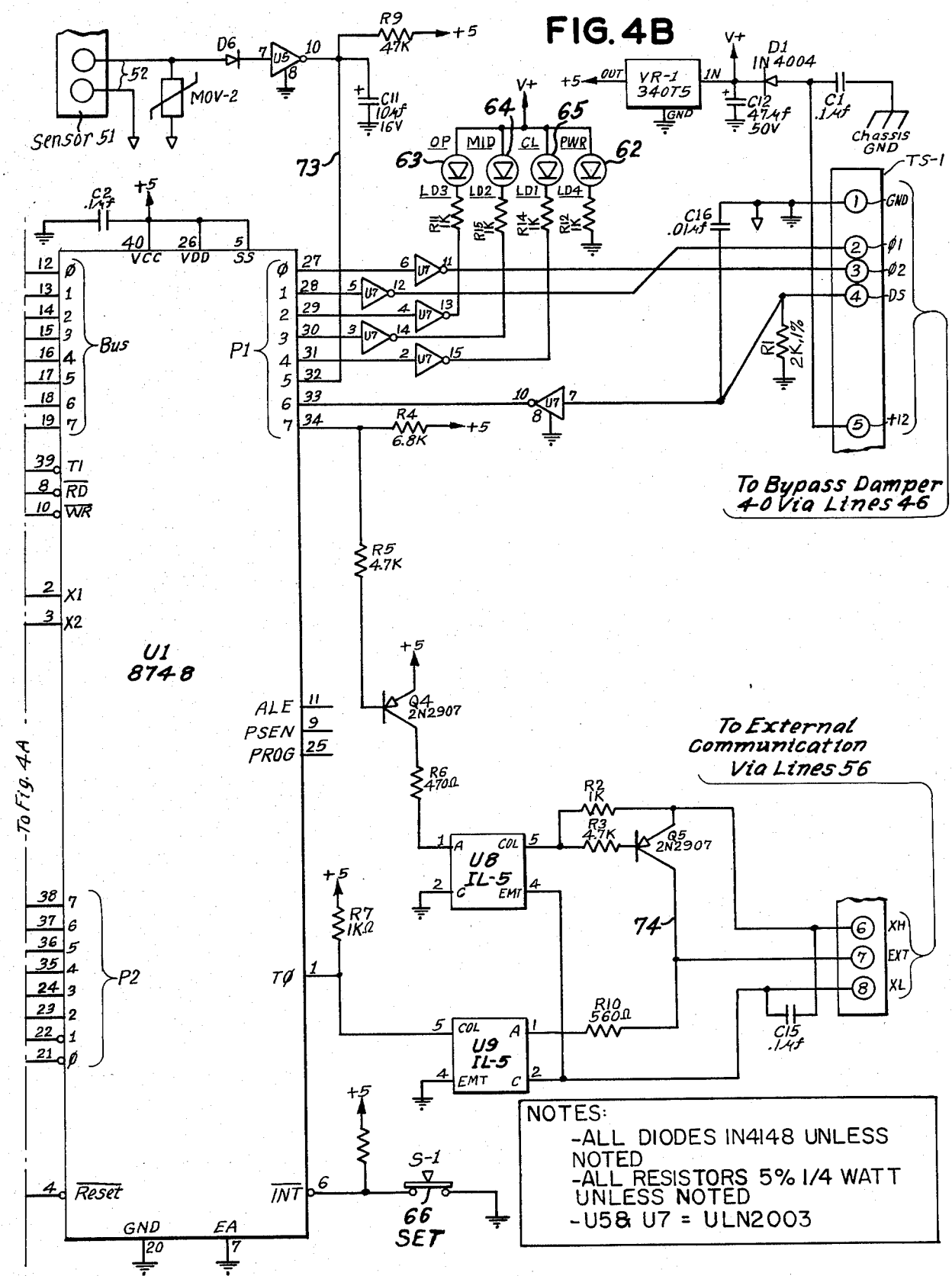

The monitor and controller 45 employs electronic circuits described hereinabelow in conjunction with monitor and controller firmware which is set forth in the Appendix hereto. As seen in FIG. 4 the electronic circuitry contained in the controller 45 operates under the control of set (and reset) switch 66 which is disclosed on the front face panel of the controller 45 in the preferred embodiment. The circuitry includes a microprocessor device U1 and a program memory U2 which stores the programmed memory therein in the form of instruction codes to be executed by the microprocessor U1. In the preferred embodiment, the program stored in the memory U2 is machine language.

Prior to further describing the circuit of FIG. 4, the memory U2 is initially set as follows:

1. Set all zone thermostats 12 to the open position.
2. After two minutes, for dampers 14 have opened fully.
3. The HVAC unit fan is activated.
4. Balance the HVAC air distribution system making certain that the bypass damper 40 is fully closed; the filters of the HVAC unit 22 are clean; and all dampers 14 are open fully or set to their maximum open limit.
5. Connect the 24 VAC power to the bypass damper 40.
6. Press the set button 66 on the controller 45 only once. This will drive the bypass damper closed, if it is not already in this position, and bring the closed light 65 on constantly.
7. With the closed light 65 on constantly, press the set button 66 a second time. The desired fan current is now recorded in the memory U2 and corresponds to the static duct air pressure the bypass damper 40 will attempt to maintain in the system.

It is to be noted that each time the set button 66 is activated with the bypass damper 40 in the fully closed position and the closed light on constantly, the memory U2 will be reset, and thus button 66 should not be activated unless resetting is desired.

After resetting the memory U2, the system can be tested as follows:

1. With the HVAC fan on, set several of the thermostats 12 to closed positions. This will drive the dampers 14 to the closed positions.
2. As the dampers 14 close, the bypass damper 40 should start opening.
3. Reset the thermostats 12 to open positions. This will drive the dampers 14 to the open positions.
4. When the dampers are in the fully open positions, the bypass damper 40 should be in the fully closed position.

It is to be noted that when the fan motor 47 of HVAC unit 22 cycles off, the bypass damper 40 will drive to the closed position.

The bypass monitor and controller 45 activates and deactivates the motorized bypass damper 40, in accord with changes in the amperage drawn by the fan motor 47. Thus, the bypass damper 40 correspondingly moves in accord with the HVAC unit 22 fan current which is monitored by the bypass monitor and controller 45. Upon a drop in the monitored fan current, the bypass damper 40 opens until the monitored fan current returns to its original setting. When the fan current is 0 Amps, indicating no fan operation, the bypass damper returns to the fully closed position.

As previously set forth the bypass monitor and controller 45 is designed to monitor one or two fan speeds and each fan speed monitored requires a sensor (49 or 51) in the form of a current transformer. The bypass monitor and controller 45 includes the power on, fully open, fully closed, and in-between indicator lights 61-65. Fully open and fully closed lights 63 and 65 will flash to indicate damper movement in those respective directions. The pushbutton switch 66 is depressed to set the controller memory U2 and is used to reset same. Upon a power failure, the bypass monitor and controller 45 will maintain memory for a minimum of 72 hours, so that resetting is not required.

Referring again to FIG. 4, the electronic circuitry for the bypass monitor and controller 45 includes a metal oxide varistor MOV-1 that shunts the electrical connection 48, leading to sensor 49 in the form of a current transformer clamped around the common lead of the fan motor 47, and provides protection of the electronic circuity from spurious and/or transient excessive voltages which may be caused by the fan motor start up current. DC blocking and impedance matching between sensor 49 and the AC to DC converter 70 is provided by resistors R30 and R31, and capacitor C6. The converter 70 includes a voltage divider formed by resistors R19 and R20 for providing a bias voltage to the dual operational amplifiers U4, such amplifiers U4, resistors R32, R35 and R36, diodes D7 and D8 and amplifier Q1 provide a precision AC rectifier circuit with a current pump output at the collector 71 of Q1. The value of the bias voltage on amplifiers U4 does not effect the current pump output provided that the bias voltage is greater than an emitter-base drop across the amplifiers U4 plus the highest anticipated voltage output (or 5.0+0.6−5.6 V) and less than the maximum output voltage (or 10.4 V) of the amplifiers U4. An acceptable bias voltage for the amplifiers U4 was selected at 8.6 V (±10%). Capacitor C7 is connected between the base and collector of amplifier Q1 and integrates the DC output to provide a more uniform or smoother DC current output, which is further enhanced and smoothed by capacitor C8.

Conversion of the DC current output to a voltage output is provided by a switchable load resistance provided by amplifier Q2, resistors R8, R29, R33 and R34. Microprocessor U1 pin 24 controls the operation of amplifier Q2 and when it is rendered inoperative, voltage is developed across resistors R33 and R34 and corresponds to 10 amps full scale. When Q4 is operative, resistor R33 is bypassed and the full voltage is developed across resistor R34 and correspond to 20 amps full scale. The voltage developed across resistor R34 (or resistors R33 and R34) is provided to the input of the analog to digital converter U3 pin 6 and clamped by diode D4 so that the voltage input cannot rise to a level to be destructive to A-D converter U3 or the microprocessor U1, etc. The A-D converter U3 includes an internal clock and employs external timing components of capacitor C9 and resistor R18 across pins 4 and 19. Pins 11 through 18 of the A-D converter U3 constitute the tri-state outputs therefrom which are respectively connected to the data bus pins 19 through 12 of microprocessor U1.

To initiate a conversion by A-D converter U3, microprocessor U1 enables A-D converter U3 by dropping U1 pin 21 low and U3 pin 1 low and then performing a write operation which pulses U1 pin 10 and U3 pin 3 low. The microprocessor U1 determines when the conversion is accomplished by testing its T1 input (U1 pin 39) which is coupled to U3 pin 5. To read the data, the microprocessor U1 again enables A-D converter U3 by dropping U3 pin 1 low and then performs a read operation which pulses U1 pin 8 and U3 pin 2 low. The A-D converter U3 provides the converted data from the sensor 49 to the microprocessor U1 for the entire duration of the read pulse through U3 pins 11 through 18 and U1 pins 19 through 12.

As previously briefly discussed hereinabove, the memory of the bypass monitor and controller 45 must be set in accord with the previous instructions. The memory U2 stores the reference fan motor current from the common of the fan motor 47 and, if a two speed motor, from the high speed fan motor lead, in separate sections of U2 corresponding to the low and high speed readings. Also, U2 includes a section to store error detection codes which are used in the final testing of the monitor 45 during manufacture and the storage of various errors detected by the monitor system during operation thereof, for example, spurious or garbled signals which may be received from either current sensors 49 or 51, and this section of the memory U2 may be addressed and the information transmitted via lines 56 to the external computer. Rechargeable battery B-1 provides auxiliary power for the memory U2 which operates during a power failure or the like for up to approximately 72 hours so that the data within memory U2 is not erased. Diodes D2 and D3 isolate battery B-1 from the power supply while resistor R16 provides a trickle charge current for battery B-1.

The data input lines of memory U2 pins 4, 6, 10 and 12 and output lines of memory U2 pins 5, 7, 9 and 11 are respectively coupled to microprocessor U1 pins 12, 13, 14 and 15 which are also coupled to A-D converter U3 pins 18, 17, 16 and 15. To write data to the memory U2, the microprocessor U1 provides the address instructions on U1 pins 35 through 38 which are respectively connected to memory U2 pins 1, 15, 14 and 13. The microprocessor U1 then brings U1 pin 22 low and pin 23 high to enable the memory U2, and thereafter a write operation is performed which pulses memory U2 pin 3 low while placing the data to be stored on the bus of the microprocessor U1 pins 12, 13, 14 and 15. Data is read from the memory U2 by the microprocessor U1 placing the desired address on U1 pins 35 through 38 and selects the memory by bringing U1 pin 22 low and pin 23 high. The data in the memory U2 is thus placed on the bus of the microprocessor U1 pins 12, 13, 14 and 15, and this data can be utilized by the microprocessor U1. To protect the memory darlingtons U5 are connected between microprocessor U1 pin 22 and memory U2 pin 2 and provide a safety lock-out of the memory U2 enable function during low power conditions since microprocessor U1 pin 22 must be low and U1 pin 23 high in order to enable the memory. When there is a loss of power or a sufficiently low power condition, the microprocessor U1 is in a reset mode and is incapable of making U1 pin 22 low and U1 pin 23 high. Resistor R17 is connected between U5 pin 12 and U2 pin 16 to insure that an adequate power supply exists at U2 pin 16 before U2 memory can be enabled. This also enhances the noise immunity of the memory U2. Resistor R28 provides an additional drive for darlington U5 pin 5 to make certain that U5 pin 12 can pull down well into the guaranteed logic 0 voltage range of memory U2, but only if the power source is sufficient as determined by the reset circuit or power glitch detector 72 connected to U1 pin 4. The reset circuit 71 includes an operational amplifier U6, resistors R22-R25 functioning as a voltage divider and hysteresis resistor R26 comprise a power failure detection circuit. When the incoming +12 VDC supply through resistor R22 drops below approximately +10 VDC, then U6 pin 1 switches low which deactivates darlingtons U5 pins 13 and 15, thus causing gate Q3 to turn off and removing the additional drive hereinabove set forth, to the memory lock-out circuit U5 pin 5. Also darlington U5 pin 14 is turned on which discharges reset capacitor C10 and causes microprocessor U1 to be and stay in the reset mode until such time as the power is restored to +12 VDC and capacitor C10 recharges.

When a two speed fan motor 47 is to be monitored, another sensor 51 is looped around the high speed winding lead of the fan motor 47 and coupled to the bypass monitor and controller 45 by electrical connections 52 which are shunted by varistor MOV-2 for transient protection. A diode D6 rectifies the AC voltage emanating from sensor 51 to the input of darlington U5 pin 7. If darlington U5 is in its off or on state, capacitor C11 will respectively be discharged to ground or be charged to +5V through resistor R9. Capacitor C11 is connected by lead 73 to microprocessor U1 pin 32 and thus microprocessor U1 can determine the speed state of the fan motor 47 by reading whether capacitor C11 is charged or discharged, i.e. a charged capacitor is indicative of low speed and a discharged capacitor indicates high speed. The microprocessor U1 still employs the information received from sensor 49 to determine whether bypass damper 40 should be manipulated, but uses different criteria, if a two speed fan motor 47 is present in the HVAC unit 22 and sensor 51 is employed as hereinabove described.

The interface between the bypass damper 40 and bypass monitor and controller 45 is included therein and is provided by darlingtons U7 pins 5 and 6 which respectively connect to microprocessor U1 pins 28 and 27. The outputs of darlingtons U7 pins 11 and 12 connect to terminal strip TS-1 pins 2 and 3 which are coupled to the motorized bypass damper 40, as indicated in FIG. 3, for controlling the direction of rotation of the motor thereof and the movement of the damper blade thereof, as fully disclosed in the aforementioned application Ser. No. 434,259. Terminal strip pin 4 is employed to indicate the bypass damper status and a load resistor R1 converts the current output of the bypass damper motor to a voltage and if a low voltage of 0 to $\frac{1}{2}$ V is present, this indicates that the damper blade is closed and a high voltage indicates that the damper blade is not closed. Darlington U7 pins 7 and 10 inverts and buffers this voltage and couples same to the microprocessor U1 pin 33. The microprocessor pins 29, 30 and 31 are respectively connected to darlingtons U7 pins 4, 3 and 2 which respectively drive the LED's forming lights 63, 64 and 65, shown in FIG. 3, so that the microprocessor U1 indentifies its operational status, damper blade position, etc. The "power on" LED 62 is enabled directly from the 5 voltage regular VR1. Terminal strips TS-1 pins 1 and 5 are the power source and return of this monitor circuit board with the power +12 VDC being supplied hereto by the bypass damper circuit board through terminal strips TS-1 pins 1 and 5.

As previously noted in connection with FIG. 3, lines 56 may lead to external communication, for example, a remote computer, and this connection is made through terminal strip TS-1 pins 6, 7 and 8, pin 6 being connected to a +12 VDC supplied by the computer, pin 8 being the return to the computer, and pin 7 being the signal line to and from the computer. When a signal is received at TS-1 pin 7 it is passed to opto isolator U9 which inverts the signal and sends it to microprocessor U1 pin 1. The response from the microprocessor U1, equivalent to the indication of the status of LED lights 62-65 individually, is transmitted from microprocessor U1 pin 34 through transistor Q4 which drives opto isolator U8 which drives transistor Q5 and transmits the signal from the collector 74 via TS-1 pin 7 to the computer. The signal originating at microprocessor U1 pin 34 is inverted when it appears on TS-1 pin 7.

The microprocessor U1 provides a clock frequency of 3.57 MHz, this being determined by crystal Y1 and the capacitors C13 and 14 which are connected to microprocessor U1 pins 2 and 3. As previously described, microprocessor U1 pin 6 is connected to set and reset switch 66, U1 pin 6 being the interrupt input of the microprocessor U1. Operation of switch 66 permits one to initially set the bypass monitor and controller 45 as previously described, and to reset when required, as after a sustained power failure, a desire to reset, for example, when a fan motor 47 is repaired or replaced or has had its drives adjusted.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. In a system for providing conditioned air from a single zone HVAC unit to a plurality of zones through a duct system having a motorized zone damper associated with each zone which modulates open and closed in response to a zone thermostat in each zone, the HVAC unit including a fan and electrical motor for discharging conditioned air into the outlet of the HVAC unit and a bypass duct communicating between the outlet and the return air intake of the HVAC unit, the improvement comprising a motorized bypass damper located in said bypass duct having a damper blade movable between opened and closed positions and intermediate positions therebetween, a bypass monitor connected to said bypass damper for controlling the operation of the motor of said damper and thereby the movement of said damper blade to selected said positions, a sensor coupled between said electric motor driving said fan and said bypass monitor for providing information indicative of the amount of work being performed by said electrical motor driving said fan to said monitor, said electrical motor driving said fan performing less work when one or more of said zone dampers modulate closed thereby causing an increase in the static air pressure in the duct system, said monitor controlling said bypass damper to move its said damper blade more open to correspondingly compensate for the increase in the static air pressure by bypassing more air from said outlet to said inlet of said HVAC unit thereby maintaining the air pressure supplied by said HVAC unit to said duct system generally constant.

2. In the system as defined in claim 1 wherein said sensor is an amperage transformer looped around the electrical common lead connected to said electrical fan motor.

3. In the system as defined in claim 1 wherein said electrical fan motor is a two speed fan motor, further comprising another sensor coupled between said two speed fan motor and said bypass monitor for providing information indicative of the speed of said two speed fan motor, said bypass monitor analyzing such speed information from said other sensor and the information from said sensor before sending control signals to said bypass damper to modulate said damper blade toward opened or closed positions or positions therebetween.

4. In the system as defined in claim 3 wherein each said sensor and other sensor is an amperage transformer respectively looped around the electrical common lead and the electrical high speed lead connected to said two speed fan motor.

5. In the system as defined in claim 1 wherein said monitor includes means for establishing a communications link with an external source.

6. In the system as defined in claim 1 wherein said monitor includes indicating means indicative of the status of the operating conditions of said bypass damper.

7. In the system as defined in claim 1 wherein said monitor includes a data base and said bypass damper is responsive to said data base.

8. In the system as defined in claim 7 wherein said monitor includes a microprocessor, said sensor providing said information indicative of the amount of work to said microprocessor, said microprocessor analyzing said information in conjunction with said data base before sending control signals to said bypass damper to modulate said damper blade toward opened or closed positions or positions therebetween.

9. In the system as defined in claim 4 wherein said monitor includes a data base and said bypass damper is responsive to said data base.

10. In the system as defined in claim 9 wherein said monitor includes a microprocessor, said sensor providing said information indicative of the amount of work to said microprocessor, said other sensor providing said information indicative of the speed of said two speed electrical motor to said microprocessor, said microprocessor analyzing said information received from said sensor and said other sensor in conjunction with said data base before sending control signals to said bypass damper to modulate said damper blade toward opened or closed positions or positions therebetween.

11. A bypass control system for monitoring and controlling the amount of air being recirculated through a bypass duct from the air supply outlet from a single zone HVAC unit including a fan motor to the air intake thereof comprising a motorized bypass damper located in said bypass duct having a damper blade movable between opened and closed positions and intermediate positions therebetween, a bypass monitor connected to said bypass damper for controlling the operation of the motor of said damper thereby the movement of said damper blade to selected said positions, a sensor coupled between said fan motor and said bypass monitor for providing information indicative of the amount of work being performed by said fan motor to said monitor, said fan motor performing less work when static air build up occurs at said air supply outlet due to closure of dampers in the duct system conditioning air in a plurality of zones thereby causing an increase in the static air pressure in the duct system, said monitor controlling said bypass damper to move its said damper blade more open to correspondingly compensate for the increase in the static air pressure by reducing same and causing more air to be recirculated through said bypass duct and maintaining the air pressure supplied by said HVAC unit to the duct system generally constant.

12. In the system as defined in claim 11 wherein said sensor is an amperage transformer looped around the electrical common lead connected to said fan motor.

13. In the system as defined in claim 11 wherein said fan motor is a two speed fan motor, further comprising another sensor coupled between said two speed fan motor and said bypass monitor for providing information indicative of the speed of said two speed fan motor, said bypass monitor analyzing such speed information from said other sensor and the information from said sensor before sending control signals to said bypass damper to modulate said damper blade toward opened or closed positions or positions therebetween.

14. In the system as defined in claim 13 wherein each said sensor and other sensor is an amperage transformer respectively looped around the electrical common lead and the electrical high speed lead connected to said two speed fan motor.

15. In the system as defined in claim 11 wherein said monitor includes means for establishing a communications link with an external source.

16. In the system as defined in claim 11 wherein said monitor includes indicating means indicative of the status of the operating conditions of said bypass damper.

17. In the system as defined in claim 11 wherein said monitor includes a data base and said bypass damper is responsive to said data base.

18. In the system as defined in claim 17 wherein said monitor includes a microprocessor, said sensor providing said information indicative of the amount of work to said microprocessor, said microprocessor analyzing said information in conjunction with said data base before sending control signals to said bypass damper to modulate said damper blade toward opened or closed positions or positions therebetween.

19. A method of monitoring and controlling the amount of air recirculated through a bypass duct of a single zone HVAC unit supplying conditioned air to a plurality of zones through a duct system having a motorized damper associated with and controlled by a thermostat in each zone with the aid of a microprocessor and data base, comprising the following steps:
 (a) providing said data base,
 (b) providing a controllable bypass damper in the bypass duct,
 (c) sensing from the fan motor the information indicative of the amount of work being performed by the fan motor,
 (d) supplying the information to the microprocessor,
 (e) controlling from the microprocessor in conjunction with the data base and the information received by the microprocessor the bypass damper to maintain the pressure of the air supplied by the HVAC unit to the duct system generally constant.

20. The method as defined in claim 19 further comprising the following steps:
 (f) determining the speed state of the fan motor,
 (g) supplying the speed state information to the microprocessor,
said steps (f) and (g) being performed prior to step (e).

* * * * *